Figure 1:
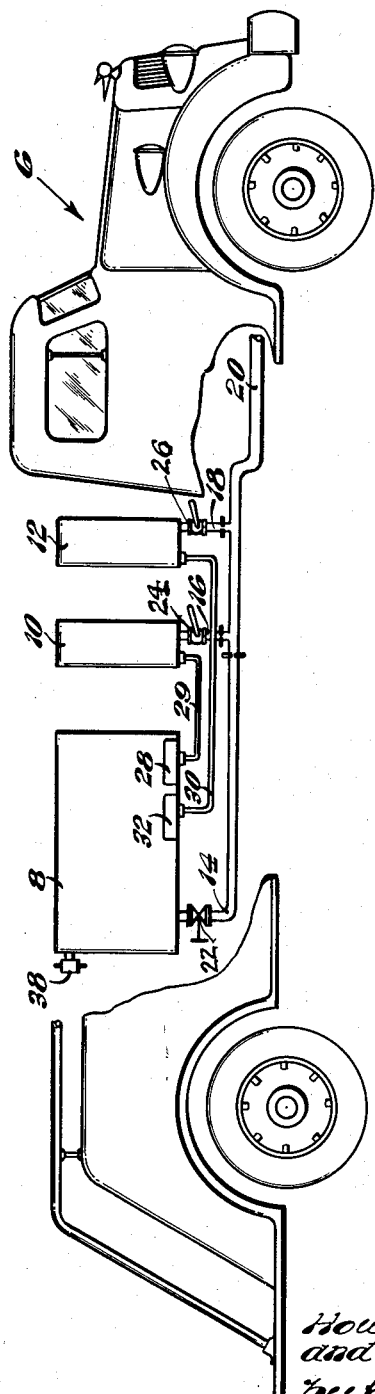

Feb. 23, 1954    H. G. FREEMAN ET AL    2,670,104
LIQUID PROPORTIONING APPARATUS
Filed June 22, 1950    2 Sheets-Sheet 2

Inventors.
Howard G. Freeman
and Gordon T. Gurney.
By Kenway Jenney Witter & Hildreth
Attys

Patented Feb. 23, 1954

2,670,104

UNITED STATES PATENT OFFICE 2,670,104

LIQUID PROPORTIONING APPARATUS

Howard G. Freeman and Gordon T. Gurney, Worcester, Mass., assignors to Rockwood Sprinkler Company, Worcester, Mass., a corporation of Massachusetts Application June 22, 1950, Serial No. 169,694

10 Claims. (Cl. 222—145)

The present invention relates to liquid proportioning apparatus and more particularly to apparatus for mixing two or more liquids and maintaining their proportions substantially uniform under all conditions.

Apparatus of this general character is typified by foam equipment for fire fighting. A definite proportion of foam liquid is mixed with water, and a wetting agent in definite proportions may also be supplied. The several liquids may be supplied from separate tanks as in the case with portable fire fighting equipment, for example crash trucks and the like, or the water may be supplied from mains while the foam liquid and wetting agent are supplied from tanks.

An example of liquid proportioning apparatus is given in the copending application of Freeman, Serial No. 52,991, filed October 6, 1948, which has matured into Patent No. 2,577,457, dated December 4, 1951. In the apparatus described therein the liquids are supplied from tanks and are metered through orifices before mixing. The cross-sectional areas of the tanks and the areas of the orifices are in proportion to the relative amounts of the liquids to be mixed. Such a system is particularly suitable for portable equipment. As the liquid levels fall they maintain equal heads, and therefore the proportions are accurately maintained during the entire period of operation. The apparatus does, however, present the disadvantage of inflexibility since a change in desired proportions of liquids may require a change of tanks; furthermore, supply of water under direct pressure from the mains will usually result in variable proportioning of the liquids.

The principal object of the present invention is to provide a system for proportioning liquids whereby substantially uniform proportioning is obtained, notwithstanding variations in level and even with direct pressure connections for one or more of the liquids.

With this object in view the principal feature of the present invention comprises a liquid supply system embodying one or more tanks, together with pressure-equalizing accumulators, preferably in the form of flexible bladders or bags, each placed within the confines of one of the tanks while being connected internally to another tank. In portable equipment or in equipment where all liquids are supplied under tank pressures, it suffices to place all of the bladders within one of the tanks while their interiors are individually connected to the other tanks. If desired, the accumulators may be in the form of piston-operated chambers, although the bladders are considered preferable for simplicity and also for maintaining complete separation of the liquids. Direct pressure may also be used, as in the case of a connection to the water main, and the accumulator will likewise maintain uniform proportions of the liquids.

Various arrangements may be used as will be clear to those skilled in the art from the following description. The invention also consists of certain novel features of construction, combinations and arrangements of parts hereinafter described and particularly defined in the claims.

Figure 2:
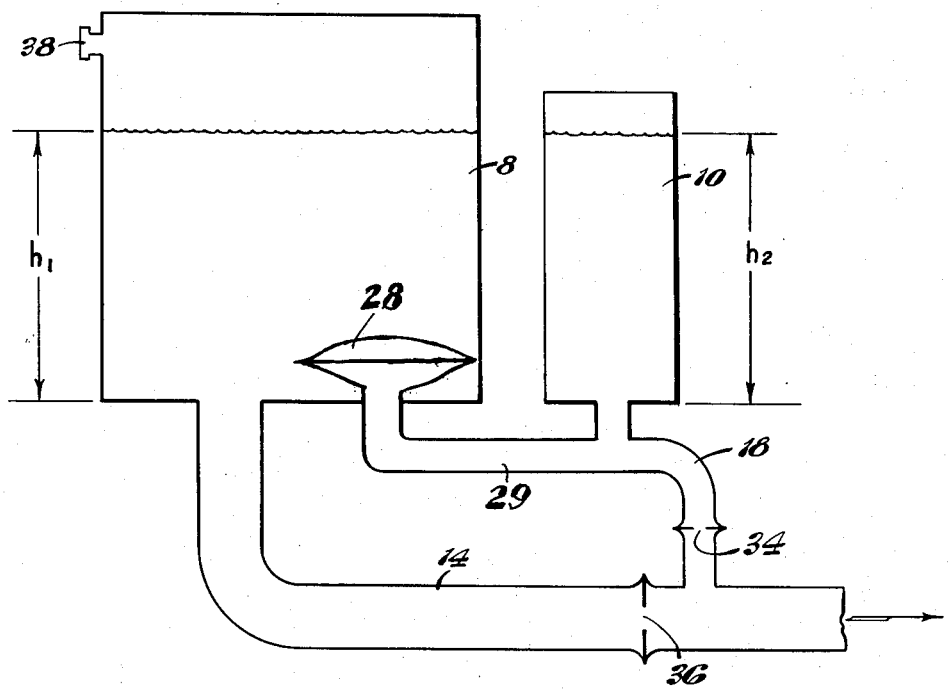
Figure 3:
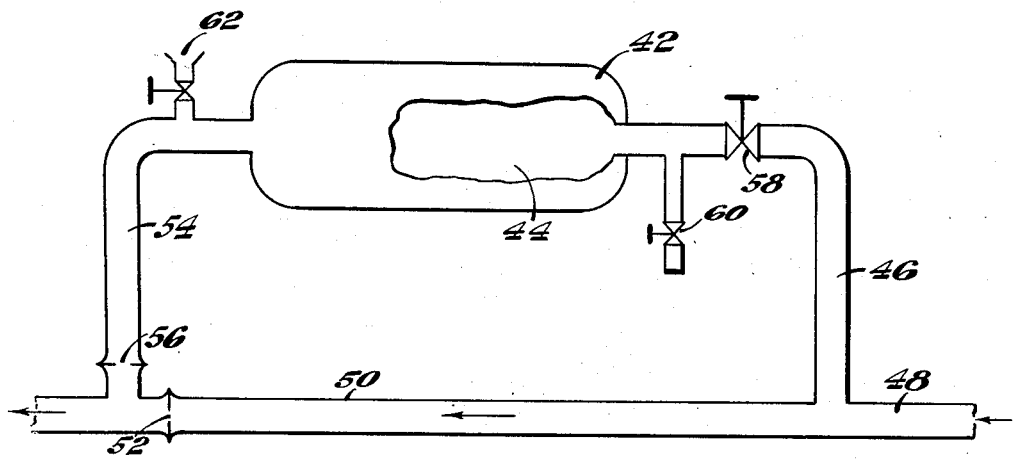

In the accompanying drawings, Fig. 1 is a diagrammatic side elevation of a fire-flighting truck carrying liquid proportioning apparatus of the present invention; Fig. 2 is a diagram illustrating the operation of the apparatus; and Fig. 3 is a diagram of a modified form of apparatus.

The apparatus shown diagrammatically in Fig. 1 comprises a portable truck 6 provided with a water tank 8 and a tank 10 carrying foam liquid, or stabilizer as it is sometimes called. A third tank 12 may also be provided for wetting agent. The water is to be supplied in the greatest proportion, usually about 90%, with five to six percent foam liquid and the remainder wetting agent. A pipe 14 leads from the water tank and pipes 16 and 18 lead from the tanks 10 and 12, respectively, into the pipe 14. The pipe 14 is connected to a suitable pump indicated diagrammatically at 20, and connected to any suitable nozzle or turret equipment.

Metering devices, preferably in the form of simple orifice plates to be presently described are connected in the lines 14, 16 and 18 for metering the different liquids. Valves 22, 24 and 26 are also placed in the separate lines whereby one or more fluids may be completely shut off; for example, a straight stream of water for use as a spray or fog may be supplied by shutting off the valves in the lines 16 and 18.

An accumulator 28 which is shown as being in the form of a flexible bladder or bag is contained in the tank 8 and is connected by a pipe 29 with the tank 10 whereby the accumulator is filled with fluid from the tank 10. If a third tank as for wetting agent is used as indicated at 12, it is connected by a line 30 with a second accumulator 32 within the tank 8.

The operation of the system thus far described is explained by reference to Fig. 2 which shows the apparatus diagrammatically for two tanks only. It will be observed that the line 18 is provided with an orifice plate 34 while the water line 14 is provided with an orifice plate 36. These plates are provided with orifices having areas proportional to the relative amounts of liquid to be mixed.

The quantity of discharge through an orifice is given by the following formula:

$$Q = cA\sqrt{2gh}$$

where
- $Q$ = Quantity of discharge in cubic feet per second.
- $c$ = The orifice coefficient.
- $A$ = The area of the orifice.
- $h$ = Total head of liquid due both to liquid level and to the head produced by the pump.

In Fig. 2 let the height of liquid in the water tank (above any suitable datum) be represented by $h_1$ and the height of liquid in the foam liquid tank be represented by $h_2$. The pressure on any particle of liquid within the accumulator due to the water pressure outside must equal the pressure exerted on said particle by the height of liquid in the tank 10. In other words, $h_1$ must always equal $h_2$ so long as the accumulator is sufficiently flexible to accept or discharge liquid through the line 29 and so long as a supply of foam liquid is present within the accumulator. Therefore, if the foam liquid is used at a sufficient rate so that its head tends to fall faster than the head of water, the unbalanced water pressure on the outside of the accumulator will tend to force foam liquid from the accumulator through the line 28 into the tank 10; on the other hand if the foam liquid level tends to fall more slowly than the water level, the increased head in the line 10 will tend to pass liquid through the line 28 into the accumulator. As a result the accumulator always tends to equalize the heads of liquid.

In practice the relative sizes of the tanks will be at least approximately equal to the desired relative proportions of liquid. Thus, for example, if a 94–6 proportion is to be maintained, the tanks may be of the relative cross-sectional areas in that proportion. (It will be understood that the orifices will be in the 94–6 proportion.) If, however, a change to, say, a 90–10 proportion is desired, one or both orifices will be changed, or one or both orifices may be variable, i. e., of the variable slit type or other suitable design. However, it is unnecessary to change the tanks. The automatic proportioning afforded by the accumulator maintains the liquid heads substantially equal and causes the fluids to be mixed in the proportions determined by the orifices. The equality of heads is maintained so long as liquid is in the accumulator and the capacity of the accumulator is not exceeded. If the tank-areas differ greatly in their ratio from the orifice-area ratio, the accumulator may be called on to accommodate variations over the entire range, and the capacity of the accumulator should be sufficient for that purpose. The capacity of the accumulator is determined by its shape, and the ultimate capacity would be reached when a spherical shape was assumed. It is contemplated, however, that the equalizing tendency may be maintained without excessive changes in shape of the accumulator. It is preferable that reliance be placed mainly on the changes in volume of the accumulator due to flexibility and not to elasticity, since any stretching of the walls would result in a higher pressure on the foam liquid than on the water.

The considerations mentioned in connection with Fig. 2 apply equally to the use of two or more auxiliary tanks as indicated by the tank 12 of Fig. 1. The accumulators 26 and 32 will accommodate themselves for maintenance of substantially uniform heads on all liquids.

The invention is also applicable to systems in which one of the liquids, say the water, is obtained from mains. This can be seen by considering that the tanks 10 and 12 of Fig. 2 are closed at the top and water is introduced under pressure into tank 8 from a supply connection 38. In such case the accumulator will discharge liquid in such a manner as to maintain uniform pressures on both the water and the foam liquids, and the hydraulic pressures at the entrance sides of the two orifices will be equal.

In Fig. 3 is shown a modified water pressure system, i. e. a system in which water pressure is obtained from the mains, wherein the accumulator is supplied with water internally. This system comprises a pressure tank 42 containing foam liquid, and the interior of the tank is provided with an accumulator or bladder 44 connected by pipe 46 with a water main 48. The main 48 is connected to water supply pipe 50 containing an orifice 52. The pressure tank 42 is connected with a pipe 54 containing an orifice plate 56. The accumulator 44 is preferably a rubber bag which has, when full, the same dimensions as the inside of the tank 42. A valve 58 and a drain valve 60 are provided in order to isolate the interior of the accumulator from water pressure, and a valved filling pipe 62 is provided to introduce liquid into the tank 42. From the considerations previously outlined, it will be seen that equal hydraulic pressures exist on the entrance sides of the orifices regardless of the amount of liquid within the tank 42, so long as there is some liquid in the tank. Hence, uniform proportions of liquid as determined by the areas of the orifices are maintained as the foam liquid is used up.

The invention is not limited to the particular constructions herein illustrated and described. For example, in the system of Fig. 3, additional pressure tanks and accumulators may be provided if two or more liquids are to be mixed with the water. The accumulators are preferably flexible bags, but may be any form of expansible chamber to accommodate changes in volume without excessive stretching of the walls. Although the invention has been described as applied to foam material for fire fighting, it is applicable to the proportioning of other liquids.

Having thus described the invention, I claim:

1. Liquid proportioning apparatus comprising two sources of liquid under pressure, a rigid container for one liquid, metering devices for the liquids, an accumulator comprising an expansible chamber within the rigid container and having its interior filled with the second liquid and its exterior subjected to the pressure of the liquid in the rigid container, and a connection from the source of the second liquid to the interior of the expansible chamber.

2. Liquid proportioning apparatus comprising two sources of liquid under pressure, a rigid container for one liquid, metering devices for the liquids, an accumulator comprising a flexible bladder having its interior filled with the second liquid and its exterior subjected to the pressure of the liquid in the rigid container, and a connection from the source of the second liquid to the interior of the bladder.

3. Liquid proportioning apparatus comprising two rigid tanks containing different liquids, connections from the tanks to conduct the liquids to a mixing point, metering devices in said connections, and means for maintaining uniform proportions of the liquids notwithstanding changes in the liquid levels including an expansible chamber having its interior filled with one liquid and its exterior subjected to the pressure of the other liquid.

4. Liquid proportioning apparatus comprising two rigid tanks containing different liquids, connections from the tanks to conduct the liquids to a mixing point, metering devices in said connections, and means for maintaining uniform proportions of the liquids notwithstanding changes in the liquid levels including an expansible chamber within one tank and subjected to the pressure of the liquid therein, and a connection from the other tank to the interior of said chamber.

5. Liquid proportioning apparatus comprising two rigid tanks containing different liquids, connections from the tanks to conduct the liquids to a mixing point, metering devices in said connections, and means for maintaining uniform proportions of the liquids notwithstanding changes in the liquid levels including a flexible bladder having its interior filled with one liquid and its exterior subjected to the pressure of the other liquid.

6. Liquid proportioning apparatus comprising two rigid tanks containing different liquids, connections from the tanks to conduct the liquids to a mixing point, metering devices in said connections, and means for maintaining uniform proportions of the liquids notwithstanding changes in the liquid levels including a flexible bladder within one tank and subjected to the pressure of the liquid therein, and a connection from the other tank to the interior of said bladder.

7. Liquid proportioning apparatus for two liquids comprising a pressure source for one liquid, a rigid pressure tank, an expansible chamber within the tank, one of the liquids being contained within the expansible chamber and the other within the tank exteriorly of the chamber, and metering devices for the liquids.

8. Liquid proportioning apparatus for two liquids comprising a pressure source for one liquid, a rigid pressure tank, an expansible chamber within the tank, a connection from the pressure source to the interior of the expansible chamber, and connections from the pressure source and the tank to a mixing point having individual metering devices for determining the proportions of the liquids.

9. Liquid proportioning apparatus comprising a liquid discharge line, means for supplying liquids to said line and for maintaining said liquids in substantially uniform proportions comprising a plurality of rigid tanks, connections from the tanks to the liquid discharge line, orifice plates in the said connections and having orifices of sizes proportional to the desired proportion of liquids, an accumulator comprising an expansible chamber within one of the tanks and having its exterior subject to the pressure of the liquid in said tank, and a connection from the other tank to the interior of said accumulator to maintain said accumulator filled with the liquid from said second tank, whereby the heads of liquids in said tanks are maintained substantially equal.

10. Liquid proportioning apparatus comprising a liquid discharge line, means for supplying liquids to said line and for maintaining said liquids in substantially uniform proportions comprising a plurality of rigid tanks, said tanks being of cross-sections approximately proportional to the desired proportion of liquids, connections from the tanks to the liquid discharge line, orifice plates in the said connections and having orifices of sizes proportional to the desired proportion of liquids, an accumulator comprising an expansible chamber within one of the tanks and having its exterior subject to the pressure of the liquid in said tank, and a connection from the other tank to the interior of said accumulator to maintain said accumulator filled with the liquid from said second tank, whereby the heads of liquids in said tanks are maintained substantially equal.

HOWARD G. FREEMAN.
GORDON T. GURNEY.

References Cited in the file of this patent

UNITED STATES PATENTS

| Number | Name | Date |
|---|---|---|
| 1,781,295 | McCracken | Nov. 11, 1930 |
| 1,781,299 | Prutzman | Nov. 11, 1930 |
| 2,510,269 | Winter | June 6, 1950 |
| 2,577,457 | Freeman | Dec. 4, 1951 |

FOREIGN PATENTS

| Number | Country | Date |
|---|---|---|
| 329,688 | France | June 6, 1903 |
| 616,689 | France | Feb. 5, 1927 |